Feb. 18, 1941.  A. R. BARNETT  2,232,360
APPARATUS FOR SURVEYING BOREHOLES
Filed Oct. 18, 1937  4 Sheets-Sheet 2

Inventor
Arthur R. Barnett
By Edwin D. Jones
Attorney

Patented Feb. 18, 1941

2,232,360

UNITED STATES PATENT OFFICE 2,232,360

APPARATUS FOR SURVEYING BOREHOLES

Arthur R. Barnett, Los Angeles, Calif., assignor of one-third to Joe W. Culbertson, Los Angeles, Calif., and one-third to Technical Oil Tool Corporation, a corporation of California Application October 18, 1937, Serial No. 169,614

10 Claims. (Cl. 255—1)

My invention relates to methods of and apparatus for surveying boreholes such as oil wells, and it has particular reference to methods and apparatus by which a borehole is surveyed through use of instruments within the drill pipe.

In accordance with previous methods and apparatus, it is necessary to lower on a line or drop into the drill pipe, a single surveying instrument which measures and records or indicates the degree of inclination of the hole from the vertical; or two instruments, one sensitive to degree of inclination, and the other sensitive to direction of inclination. To gain access to and read the instrument or instruments under the drop method, it is necessary to withdraw the entire drill pipe, or lower an overshot and withdraw the instrument on line.

Under that line method where an indicating or recording instrument is permanently situated at the surface of the well and the actual surveying instrument is lowered into the drill pipe on a line, it is necessary to withdraw the surveying instrument after each survey in order that the instrument may not be damaged upon continued drilling or operation of the drill pipe and fluid circulation interfered with. Under another line method, where the instrument lowered into the drill pipe not only surveys but records, it is, likewise, necessary to withdraw the instrument following each survey to avoid instrument damage and drilling interference.

In spite of the innumerable difficulties presented in the performance of the above described methods, they have been adhered to for want of a method as embodied in my invention which eliminates dropping and recovering by withdrawal of the drill pipe, or the use of a line, and yet a survey of the hole at any point desired in the drilling thereof can be instantly and accurately made upon bringing the drill pipe momentarily to a standstill.

It is a purpose of my invention to provide a method and apparatus for surveying boreholes by the permanent positioning in the drill pipe so as not to interfere with fluid circulation, of a survey instrument which supplies electric current modified in accordance with the survey, to a registering or recording instrument at the top or surface of the hole, which is sensitive to such current modifications to register or record the survey made by the survey instrument.

It is also a purpose of my invention to provide a method of and apparatus for surveying boreholes through the drill pipe by the permanent positioning in the drill pipe of two survey instruments, one instrument sensitive to degree of deviation from the vertical, and the other sensitive to direction of hole deviation, and which instruments supply electric current modified in accordance with degree of deviation by one instrument and further modified in accordance with direction of deviation by the other instrument, to a registering or recording instrument situated at the surface of the hole and sensitive to both current modifications so as to register or record the two surveys made by the surveying instruments.

A further purpose of my invention is the provision of a drill pipe having permanently secured therein but insulated therefrom, one or more electrical conductors for cooperation with the drill pipe when using a single conductor, or independently thereof when using a plurality of conductors to form an electrical circuit by which current is conducted from the survey instrument or instruments in the drill pipe, to the registering or recording instrument at the surface of the hole. Each conductor is made in sections corresponding in number to the sections of the drill pipe, and the ends of each conductor section are provided with electrical connectors by which the conductor sections are electrically connected one to the other or disconnected one from the other according as the pipe sections are connected to or disconnected from each other.

In the accompanying drawings wherein two embodiments of my invention are illustrated—

One method embodied in my invention comprises the permanent positioning in a drill pipe of a surveying instrument sensitive only to maximum deviation of a borehole from the vertical and operable to modify electric current as conducted to an electrical calibrated instrument situated at the top of the borehole, in accordance with maximum deviation, whereby the electrical instrument is caused to register or indicate such deviation.

Figure 7A:
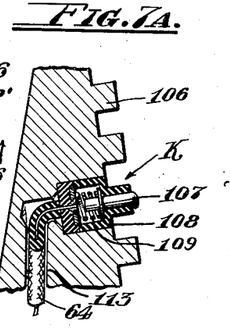
Figure 7A is an enlarged sectional fragmentary view of the pin end of the sub, showing the corresponding connector.
Figures 8, 9, 10, 11, 12:
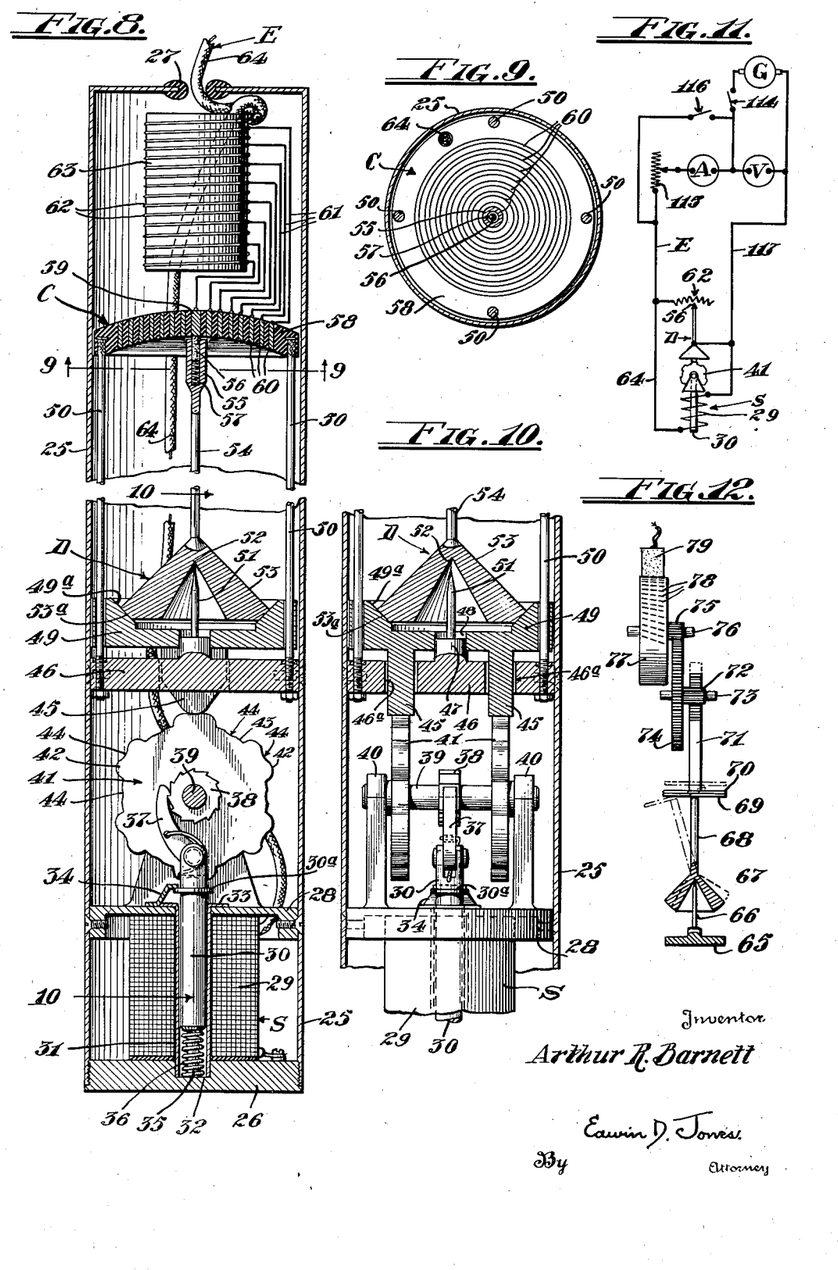
Figure 8 is a vertical sectional view showing the survey instrument and control means therefor, of one form of surveying apparatus embodying my invention.
Figure 9 is a transverse sectional view taken on the line 9—9 of Figure 8.
Figure 10 is a view similar to Figure 8 but taken at right angles thereto.
Figure 11 is a view showing diagrammatically the elements and circuits embodied in the apparatus shown in the preceding views.
Figure 12 is a view showing in side elevation another form of surveying instrument embodying my invention.

The apparatus by which this method is performed, is shown in Figures 1 to 11, with the structural details of the surveying instrument in the drill pipe and its central means, illustrated in Figures 8, 9 and 10. As here shown, a case 25 is closed at its lower end by a screw plug 26, while its upper end is formed with a central opening 27. A partition 28 is secured in the case above the plug 26 and between the two is confined the winding 29 of a solenoid S. The core 30 of the solenoid is movable vertically in a sleeve 31, the lower end of which extends into a recess 32, while its upper end is formed with a flange 33 provided with a lug 34 engaging a collar 30ª fixed on the core 30 to limit upward movement of the latter. Fixed in the recess is a stud 35 surrounded by a spring 36, the stud limiting downward movement of the core and the spring urging the core upwardly against the lug 34.

On the upper end of the core 30 is pivoted a pawl 37 urged into engagement with a ratchet wheel 38 fixed centrally to a shaft 39 journaled in trunnions 40 fixed to the partition 28. Also fixed to the shaft 39 are a pair of cam wheels 41, 41 each provided cams 42 and intervening depressions 43, all of which are formed with notches 44 to prevent the wheels accidentally turning when engaged by a pair of cams 45, 45.

A second partition 46 is fixed in the case 25 and it is formed with two slots 46ª, 46ª in which the cams 45, 45 move. Centrally the partition is formed with a stud 47 extending into an opening 48 of a centering head 49. On the lower side of this head the cams 45, 45 are formed, and the head together with the cams are movable vertically on rods 50 secured at their lower ends in the partition 46.

A pointed pin 51 extends upwardly from the stud 47 to engage the apex of a conical bearing 52 of the conical weight 53 of a pendulum D. This pendulum includes a rod 54 fixed to the apex of the weight and having at its upper end a sleeve 55 containing a contact 56 pressed upwardly by a spring 57 to engage a commutator C fixed on the upper ends of the rods 50. The upper side of the head 49 is formed with a centering and holding cup for the pendulum D, and this cup is formed with a chamfered surface 49ª which through engagement with a similar surface 53ª on the weight 53 functions to center the pendulum on its supporting pin 51.

The commutator C comprises a body 58 of insulating material having a concave underside concentric to the pendulum pivot. Within this body is a central contact 59 and a plurality of ring contacts 60. By means of conductors 61, the contacts 59 and 60 are individually connected to resistance coils 62 supported on a drum 63 of insulating material suitably secured within the case 25. The coils are connected in series, and the uppermost coil is connected to an insulated conductor or wire 64 which extends upwardly through the opening 27 and downwardly in the case where it is connected to one end of the winding 29.

In the operation of the surveying instrument, and the control means therefor, just described, the cams 45 normally repose on certain of the wheel cams 42, so that the head 49 is elevated, as shown in Figures 8 and 10, to support the pendulum D in an elevated position in which its weight is lifted off the pivot pin 51. By virtue of the surfaces 49ª and 53ª, the pendulum as supported is centered to cause the contact 56 to engage the commutator contact 59. Thus, the pendulum is secured against movement and clear of its pivot 51 to prevent possible damage thereto.

When the solenoid S is energized through a circuit which will be later described, the core 30 is drawn downwardly against the tension of the spring 36 to move the pawl 37 downwardly and thus rotate the ratchet wheel 38 a distance corresponding to the length of one tooth thereof. Under this movement the cam wheels 41 are rotated to cause the cams 42 to pass out of engagement with the cams 45 and the latter into engagement with the depressions 43. Thus the head 49 is now lowered onto the partition 46 to permit the pendulum D to rest on the pivot pin 51 and the weight 53 to clear the head, so that the pendulum is now free to respond to any maximum deviation from the vertical.

According to the angular position assumed by the pendulum once it is released, determines that contact ring 60 engaged by the contact 56, and, hence, determines the number of resistance coils included in the circuit of which the pendulum forms a part, it being clear that when the pendulum is vertical the center contact 59 is engaged to include all coils in the circuit. In this manner the surveying instrument is sensitive to modify electric current passing therethrough in accordance with the maximum degree of deviation.

In practice, the solenoid need only be energized momentarily to release the pendulum. Once the pendulum has gravitated to the maximum angle of deviation it may be restored to centered position in respect to the commutator C and locked in this position by again momentarily energizing the solenoid. With this second energization of the solenoid the pawl and ratchet mechanism is actuated to cause the wheel cam 42 to engage the head cams 45 and lift the head 49, thereby elevating the pendulum off its pivot. At the same time the pendulum is swung to the centered position through coaction of the surface 49ª and 53ª, so that the pendulum is now locked in centered position and elevated with respect to its pivot.

According to the foregoing operation of the pendulum control means, the pendulum is lowered and released, and then elevated, centered and locked as the solenoid is successively energized.

In Figure 12, I have shown another form of surveying instrument of the pendulum type which is designed to amplify current modifications so that minutes of degrees as well as degrees of deviation can be registered by my apparatus. A partition 65 corresponds to the partition 46, and it is formed with a pivot pin 66 engaging a bearing in the weight 67 of a pendulum having a rod 68 provided at its upper end with a disk 69.

The disk 69 abuts a companion disk 70 fixed on the lower end of a rack bar 71 which is suitably guided in its vertical movement. The rack bar meshes with a pinion 72 fixed to a shaft 73 with a gear 74 which meshes with a pinion 75 fixed to a shaft 76. A wheel type of commutator 77 is fixed to the shaft 76, and it has a multiplicity of resistance units therein connected in series and having the terminals 78 thereof exposed in staggered relation at the periphery of the wheel, for contact with a radial brush 79 which may be connected to the wire 64 when the present instrument is substituted for the one shown in Figure 8.

In the operation of this device, deviation of the pendulum in any direction from the vertical causes the lower disk 69 to move in a manner to elevate the upper disk 70, thereby lifting the rack bar 71 to actuate the pinions and gear and thus rotate the wheel 77. Manifestly, the pinions and gear multiply movement of the rack bar to rotate the wheel correspondingly and thereby accordingly vary the resistance interposed in a circuit to modify current flowing through the circuit to a registerable degree no matter how small the degree of deviation as indicated by the pendulum.

Figures 1, 1A, 3:
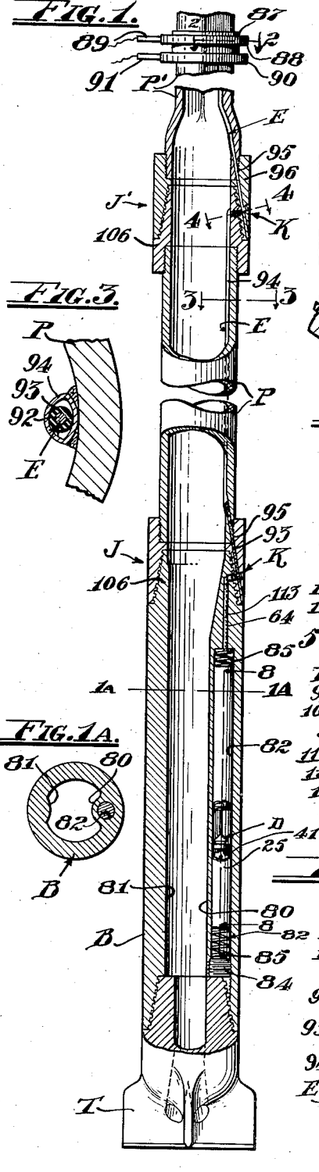
Figure 1 is a view showing vertical section and partly in elevation a drill pipe having applied thereto certain elements embodied in the apparatus.
Fig. 1A is a transverse sectional view taken on the line 1A—1A of Figure 1.
Figure 3 is a view similar to Figure 2 taken on the line 2—2 of Figure 1.

Referring now to Figure 1, a rotary drill pipe is shown as comprising a sub B, a bit T, and one of any number of pipe sections P. The pipe section is connected to the sub by a pin and box type of tool joint J, and by a similar joint J' the pipe section is connected to an upper and non-circular pipe section P' which is adapted to extend through a rotary table for rotating the drill pipe in the usual manner. The sub B is formed with two diametrically arranged thickened portions 80 and 81 and the portion 80 is formed with a pocket 82 in which the apparatus shown in Figure 8 is adapted to be received.

The case 25 is confined in the pocket 82 by a screw plug 84 applied before the bit T is connected to the sub. Suitable cushioning members, such as the springs 85, 85, are positioned at the ends of the case to protect the apparatus against shock.

With the surveying instrument and its appurtenances located in the sub, it becomes clear that the instrument is permanently positioned therein during all drilling operations.

To counterbalance the weight of the instrument and its appurtenances the thickened portion 81 is provided, and thus the weight of the instrument is ineffective to produce any eccentric motion of the drill pipe when rotated.

To conduct electrical current to the surveying instrument and the solenoid S from a source at the surface of the well and through a circuit which preferably, but not necessarily, includes the drill pipe, certain conductors and connectors have been provided which are permanent parts of the drill pipe, yet permitting easy connection and disconnection of the pipe parts when and as required.

Figure 2:
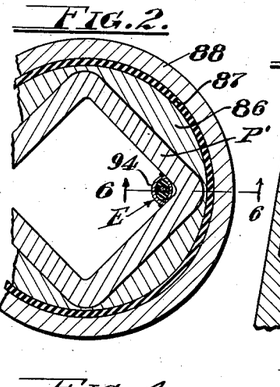
Figure 2 is an enlarged transverse sectional view taken on the line 2—2 of Figure 1.

As shown in Figures 1 and 2, the upper pipe section P' is provided with a collar 86 having a circular periphery to which is secured a ring 87 of insulation. This ring is surrounded by a collector ring 88 engaged by a stationary brush 89. A second collector ring 90 is secured directly to the pipe section P' and provided with a brush 91.

From the first collector ring 88 downwardly through the bore of the drill pipe, and finally to the wire 64 of the surveying instrument, extends an electrical conductor E. This conductor is made of sections of insulated wire, and connectors K are situated in the tool joints for joining the confronting ends of adjacent sections so that the tool joints may be screwed and unscrewed as required to connect or disconnect the conductor sections.

Figures 4, 5, 6, 7:
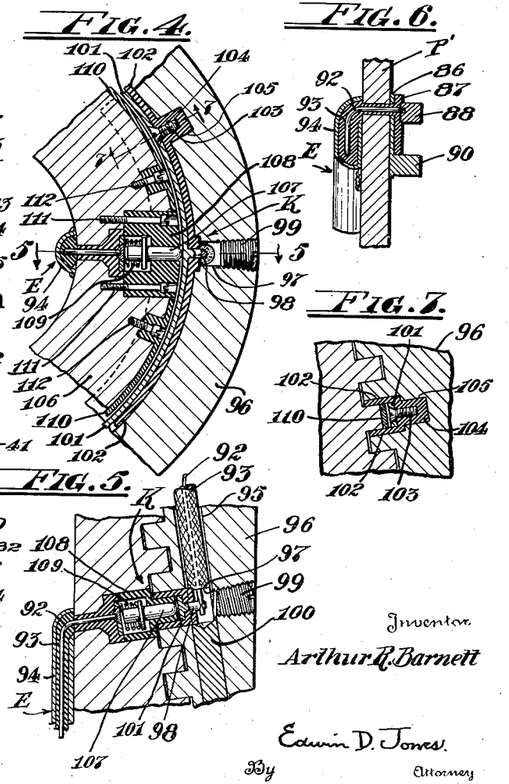
Figure 4 is a view similar to Figure 3 taken on the line 4—4 of Figure 1.
Figure 5 is a vertical sectional view taken on the line 5—5 of Figure 2.
Figure 6 is a vertical sectional view taken on the line 6—6 of Figure 4.
Figure 7 is a vertical sectional view taken on the line 7—7 of Figure 4.

Each conductor section comprises a wire 92 covered by insulation 93 and encased in a metal conduit 94 welded or otherwise secured to the wall of the bore of the respective pipe section so as to be permanently and immovably fixed thereto. In the instance of the wire for the upper pipe section P', its upper end extends through the pipe to the collector ring 88 (Figure 6). From a point where it enters the pipe it extends downwardly through the pipe and the conduit into and through a diagonal duct 95 (Figure 5). This duct 95 extends through the pipe and the box 96 of the joint J' to be intersected by a duct 97 in the box. At this point of intersection the wire 92 extends into duct 97 where it is welded to a lead 98, after which the duct is closed by a plug 99. A metal plug 100 permanently closes the lower end of the duct 95.

The lead 98 constitutes part of a connector K and projects from a conducting strip 101 (Figure 4) disposed in a groove between the threads of the box 96. This strip is insulated from the box by a strip 102 to which it is secured by screws 103 extending into radial enlargements 104 of the strip 102. These enlargements are fitted in suitable recesses 105 in the box 96 to secure both strips 101 and 102 against circumferential shifting.

That part of the connector K carried by the pin 106 of the joint J' comprises a contact stud 107 movably mounted in an insulator block 108 and urged into contact with the strip 101 by a spring 109. As the strip 101 is disposed in the groove of the box 96 the contact stud must of necessity be disposed in the thread of the pin 106. To insure easy threading of the pin in the box the pin thread is modified to accommodate the stud and block as well as insulator strips 110, 110. These strips extend in opposite directions from the block 108 (Figure 4) to insulate the conductor strip 101 from the pin 106. Screws 111 and 112 are employed to secure the block and strips in fixed position on the pin.

Through the spring 109 the stud 107 has electrical connection with the upper end of the wire 92 for the next pipe section below (Figure 5) which wire similarly extends into the bore of the pipe for connection to the wire for the next section below through a similar connector K. In this manner the wires of the conductor E are all insulated from the drill pipe and yet joined one to the other by the several connectors until the conductor reaches the sub B. The connector K for the sub is of the same construction as the other connectors, but the wire without the conduit extends from the connector into a duct 113 of the sub for connection to the wire 64 of the surveying instrument (Figure 7A).

Referring to Figure 11, I have here shown the drill pipe, the surveying instrument and the control means all incorporated in a circuit including a source of current such as the generator G, an ammeter A and a voltmeter V, all of which latter are situated at the surface or top of the borehole. The voltmeter may be connected across the terminals of the generator as required by closure of a switch 114 for checking the generator as to constant voltage. The ammeter A which is connected in series with the switch 114, constitutes the registering instrument of the apparatus and registers modifications of current as controlled by the surveying instrument permanently situated in the sub of the drill pipe.

It will be understood that the dial of the ammeter is calibrated in degrees of deviation so that the indicating hand thereof will accurately indicate the precise degree or minutes thereof of deviation.

By provision of a rheostat 115 current flow through the ammeter A can be regulated to position the indicating hand thereof at zero degrees just prior to taking a survey. By a switch 116 the rheostat and the ammeter can be shunted to cause current to flow at the full voltage of the generator directly through the solenoid winding 29, and this winding is so designed as to require a high voltage for operation of its core. In Figure 11 the drill pipe of Figure 1 is represented by the wire 117 to which the pendulum D and the winding 29 are electrically connected in parallel. Thus it is clear that the drill pipe constitutes one side of the electrical circuit, while the wire 64, the conductor E, and the connectors K constitute the other side.

The operation of the surveying apparatus is as follows:

During rotation of the drill pipe in the process of drilling a borehole, the pendulum is locked in the elevated and centered position shown in Figure 8, and thus the pendulum and its pivot are protected against damage by reason of the vibrating drill pipe. Preparatory to surveying a borehole for maximum deviation the drill pipe is first brought to a standstill, and then the indicating hand of the ammeter brought to a zero position by adjustment of the rheostat 115 following closure of the switch 114 only. The solenoid is now energized by momentary closure of the switch 116 and momentary opening of the switch 114, thus actuating the control means to release the pendulum. The pendulum now gravitates to vertical position thereby measuring on the commutator C the maximum angle of deviation of the hole from the vertical. Accordingly, one or more units of the resistance 62 are removed from the circuit depending upon the particular angle of deviation. As the resistance is removed the current flow through the ammeter is increased to move the indicating hand thereof accordingly and thereby indicate to the operator at the top of the hole the amount of hole deviation in degrees or minutes.

To restore the apparatus to a condition for continued rotation of the drill pipe or for a second survey, the switch 116 is closed and the switch 114 opened. Thus the solenoid is energized to elevate the pendulum to a locked and centered position with respect to the commutator.

Figure 13:
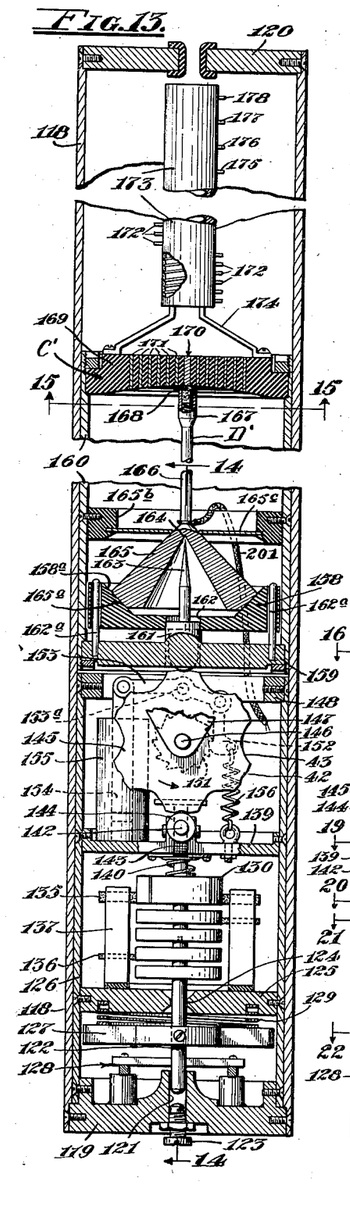
Figure 13 is a view similar to Figure 8 showing a second form of surveying instrument and control means therefor, included in a second form of surveying apparatus embodying my invention.
Figures 14, 15, 16, 17:
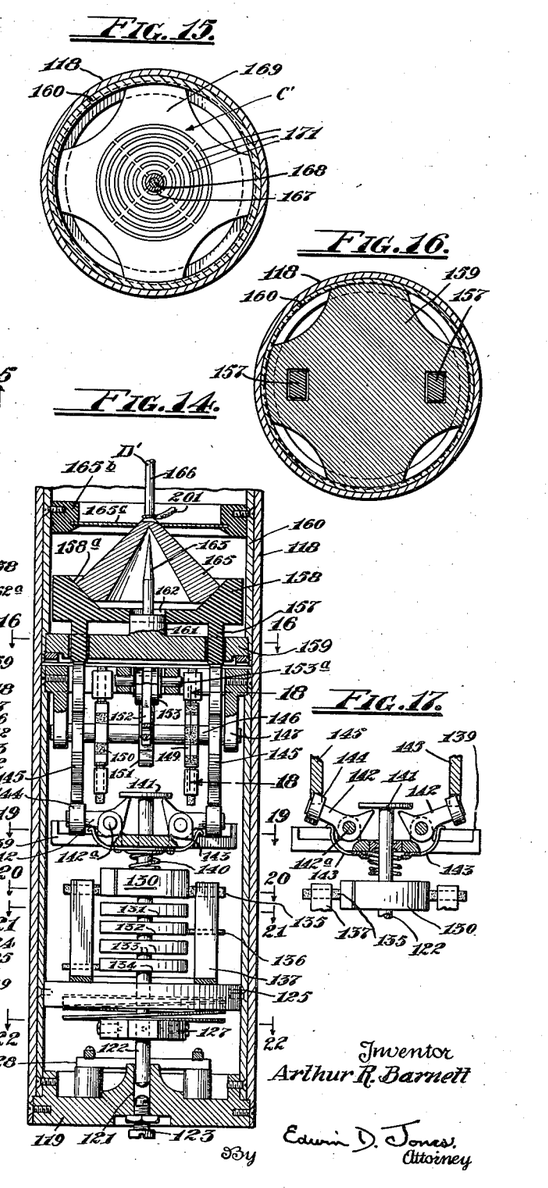
Figure 14 is a view similar to Figure 13 but taken at right angles thereto.
Figure 15 is a transverse sectional view taken on the line 15—15 of Figure 13.
Figure 16 is a transverse sectional view taken on the line 16—16 of Figure 14.
Figure 17 is a view showing another position of the levers shown in Figure 14.

In Figs. 13 to 23, is shown the second form of apparatus embodying my invention, which is characterized from the first form in its ability to survey a borehole as to both direction and degree of deviation from the vertical. In Figs. 13-14 are shown the surveying instruments and their appurtenances which are permanently positioned in the pocket 82 of the sub B in place of the surveying instrument of the first form of apparatus.

Referring to Figs. 13 and 14, the case 118 is closed at its two ends by plugs 119 and 120, the former of which is provided with a bearing 121, receiving the lower end of a shaft 122 and a jewel thrust bearing 123, adjustable in the plug to define the lowermost position of the shaft. The shaft is also journaled in a bearing 124 of a disk 125 secured in fixed position within a tube 126, the tube being fixed to the plug 119 in the manner illustrated.

Fixed to the shaft 122 below the disk 125 is a compass 127 for turning the shaft, and below the compass and supported on the plug 119 is a conventional form of compensator 128. Interposed between the compass and the disk is a coiled spring 129 for the purpose of locking the compass and shaft 122 against rotation when the two are elevated. Manifestly, when the compass is elevated, the spring is compressed to exert sufficient pressure downward on the compass to prevent rotation of the compass, and hence the shaft. Conversely, when the shaft is lowered, the spring is out of contact with the compass so that the latter is free to rotate the shaft.

Figures 18, 19, 20, 21, 22, 23:
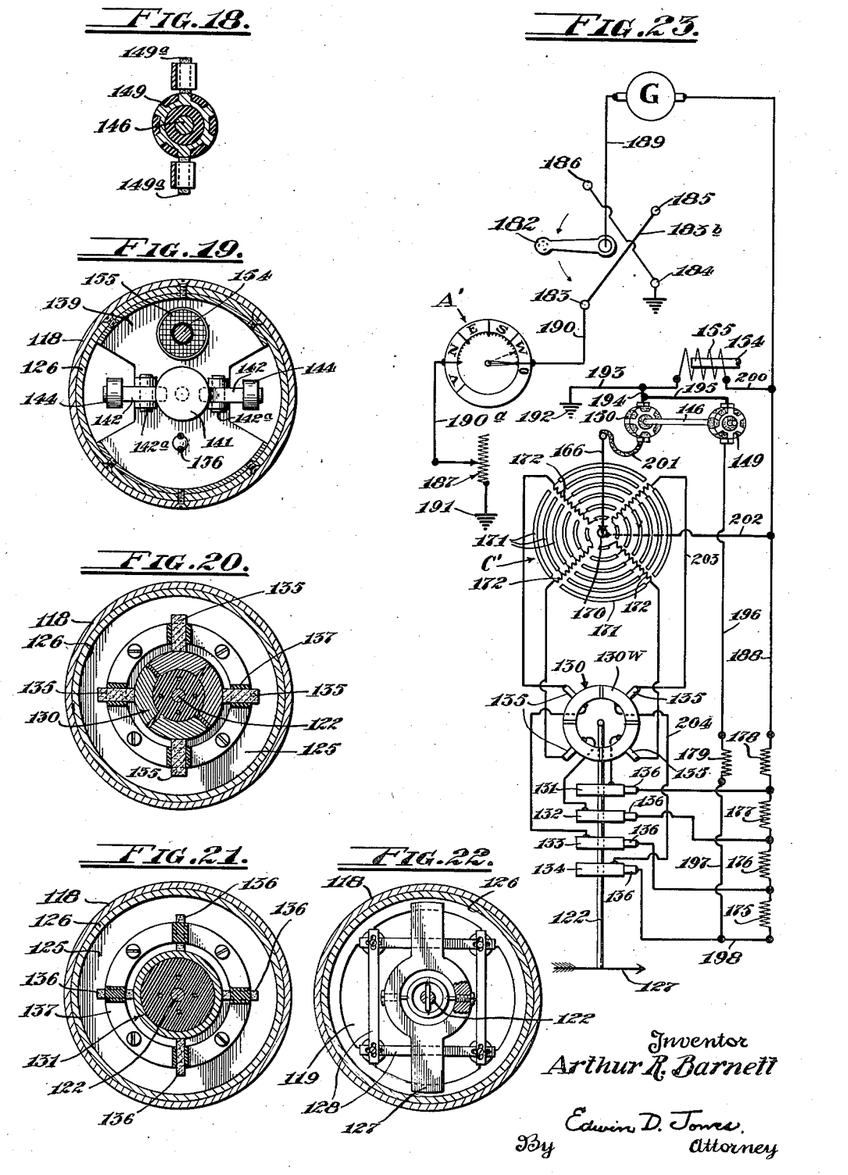
Figure 18 is a vertical sectional view taken on the line 18—18 of Figure 14.
Figure 19 is a transverse sectional view taken on the line 19—19 of Figure 14.
Figure 20 is a transverse sectional view taken on the line 20—20 of Figure 14.
Figure 21 is a transverse sectional view taken on the line 21—21 of Figure 14.
Figure 22 is a transverse sectional view taken on the line 22—22 of Figure 14.
Figure 23 is a view showing diagrammatically the elements of the second form of surveying apparatus and the circuits therefor.

Fixed to the shaft 122 at a point above the disk 125 is a current distributor comprising a commutator 120 and four slip rings, 121, 132, 133, and 134. The commutator is divided into four segments (Fig. 20) with a brush 135 for each segment. The slip rings are each insulated from the shaft 122, and there is one brush 136 for each ring (Fig. 21). All of the brushes are supported on but insulated from a suitable support 137 secured to the disk 125.

Fixed in the tube 126 above the commutator 130 is a second disk 139 through the center of which the shaft 122 extends and is journaled (Fig. 17). A coiled spring 140 is interposed between the disk and commutator to engage the latter when the shaft is elevated and thus aid the spring 129 in securing the shaft against rotation. When the shaft is lowered the spring 140 does not engage the commutator. The upper end of the shaft 122 is provided with a head 141 which is engaged by a pair of bellcrank levers 142, fulcrumed as at 142ᵃ on the disk 139, to support the shaft in elevated position and the springs 129 and 140 compressed to lock the shaft against rotation. The disk is cut away as shown in Fig. 19 so as not to interfere with the required movements of the levers.

Springs 143 urge the levers upwardly, to cause rollers 144 on the levers to engage cam wheels 145, 145. The cam wheels are fixed to a transverse shaft 146, journaled in trunnions 147 depending from a frame 148 secured to the upper end of the tube 126. The cam wheels are constructed the same as the cam wheels 41, and the same reference characters have been employed to designate the cams the depressions thereof.

Also fixed to the shaft 146 is a pair of distributor wheels 149 and 150. Each wheel is constructed in the manner illustrated in Fig. 18, to provide a plurality of radial contacts, any opposing two of which are engaged by two brushes 149ᵃ and 150ᵃ, respectively. However, as illustrated in Fig. 23, the contacts of these wheels are arranged so that when the brushes for one wheel engage a pair of contacts, the brushes of the other wheel are out of engagement with their contacts, for a purpose to be described hereinafter.

Also fixed to the shaft 146 is a ratchet wheel 151 engaged by a pawl 152 pivoted on a lever 153 fulcrumed on the frame 148 by a pin 153ᵃ and connected to the core 154 of a high resistance solenoid 155, secured to the disk 139. A spring 156 is connected to the pawl and to the disk for urging the pawl into engagement with the ratchet wheel. Manifestly, with energization of the solenoid 155, the pawl 152 is actuated to rotate the shaft 146 a distance corresponding to the length of one tooth of the ratchet wheel 151. The number of teeth on the ratchet wheel correspond to the number of depressions and cams on the wheels 145, and they in turn correspond in number to the contacts and intervening insulating segments of the wheels 149 and 150.

The cams 42 of the wheels 145 are adapted to engage and elevate a pair of cams 157, depending from a head 158, both of which are formed of insulating material. The cams 157 are movable in slots of a fluted disk 159 (Fig. 16) secured within the lower end of an upper tube 160 contained within the case 118. The disk is formed with a stud 161 extending into an opening 162 of the head 158, and provided with a pivot pin 163 for a pendulum D'. Pins 162ᵃ guide the head 158 in its vertical movements. The pin 163 is adapted to engage within the bearing 164 of a weight 165 of the pendulum.

The pendulum also includes a rod 166 which is formed at its upper end with a sleeve 167, containing a spring-pressed brush or contact 168. This brush engages the under side of a commutator C' fixed to the upper end of the tube 160. The upper side of the head 158 is formed with a center and holding cup for the pendulum D', and this cup is provided with a chamfered surface 158ᵃ which, through engagement with a similar surface, 165ᵃ of the weight 165, functions to center the pendulum on the pin 163 when the head is in the elevated position shown in Fig. 13.

A ring 165ᵇ of insulating material is secured within the tube 160, and secured within the ring is a spring metal disk 165ᵃ through the center of which the pinnacle of the weight 165 extends. The purpose of this disk is to limit upward movement of the pendulum and to cooperate with the head 158 in locking the pendulum against movement in any direction.

The commutator C' comprises a body 169 of insulating material having a concave underside concentric to the pendulum pivot. In this body is a central contact 170 and a plurality of ring contacts 171, each divided into quadrants to form four segmental groups of contacts, as illustrated in Fig. 15. The contacts 171 of each segment are connected to a resistance unit 172 in the manner illustrated in Fig. 23, and the four resistance units are mounted on a drum 173 of insulating material, supported on the body 169 by means of a bracket 174.

Also mounted in the drum 173 are four resistance units 175, 176, 177, and 178, one for each of the slip rings 131, 132, etc.; connected thereto through their respective brush, 136, as shown in Fig. 23. A fifth resistance unit 179 may be mounted on the drum 173 and connected in a circuit including all of the resistances, 175, 176, etc., through the distributor wheel 149, as shown in Fig. 23. This unit 179 corresponds in ohmic resistance to that of any one of the resistance units 172, for a purpose to be described hereinafter.

The compass 127, together with the commutator, slip rings and resistance units 175, 176, 177, and 178, constitute the instrument for surveying a borehole as to direction of deviation from the vertical. Similarly, the pendulum D' and commutator C', together with the latter's resistances, constitute the instrument for surveying a borehole as to degree of deviation from the vertical. Both instruments are controlled by the mechanism previously described, which operates as follows:

Normally, both instruments are locked against movement and to release them the solenoid 155 must be energized. The solenoid, when energized, operates the pawl and ratchet mechanism to rotate the cam wheels 145 in the direction of the arrow in Fig. 13, to move the cams 42 out of engagement with the cams 157 so that the latter move into the depressions 43. Thus, the centering head 158 is lowered to free the pendulum D' and permit it to repose on the pivot pin 163. The pendulum is now free to respond to any maximum deviation of the borehole from the vertical. According to the maximum angle assumed by the pendulum once it is released, determines the particular contact 171 of any segmental group, engaged by the pendulum contact 168.

Thus is determined the number of coils of any one resistance unit 172 included in the circuit, of which the rod 166 forms a part, it being clear from a consideration of Fig. 23 that when the contact 168 is vertical it engages the center contact 170 so that none of the resistance units 172 are included in the circuit. Also, depending upon the direction in which the pendulum swings from the center of the commutator, determines which resistance unit 172 or any portion thereof, is included in the circuit.

With rotation of the cam wheels to release the pendulum, the cams 42 move off the rollers 144 to permit the springs 143 to elevate the levers and move the rollers into the depressions 43. Thus the shaft 122 and the compass 127 are released to permit the shaft to be lowered in to the bearing 123 and the compass to rotate to a north position. Rotation of the compass rotates the commutator and slip rings to cause the segments of the commutator to respectively occupy the four cardinal directions of the compass.

In Fig. 23 is shown diagrammatically the registering instrument A' of the apparatus adapted for location at the top of the borehole, together with a generator G and a control switch including a contact arm 182 rotatable to engage any one of four stationary contacts 183, 184, 185 and 186. The registering instrument A' is an ammeter, the dial of which is divided into divisions representing the four cardinal directions of a compass, and bearing the respective legends N, E, S, and W. Each of these divisions are calibrated to indicate degrees of deviation. Also, the dial is provided with a fifth division bearing the letter V for indicating the vertical position of a borehole when the hand in the ammeter points thereto; and a sixth division bearing the letter O for indicating zero or the maximum resistance of the circuit.

In describing the operation of the apparatus, reference is had to Fig. 23, in which the circuits embodying the various instruments are illustrated. With the case 118 permanently disposed in the pocket 82 of the sub B and the wires of the conductor E joined by the connectors K to form a continuous conductor corresponding to the wire 188 in Fig. 23, and the pendulum D' and the compass 127 both locked against movement, a survey of the borehole as to both degree and direction of deviation from the vertical is effected as follows:

First the drill pipe is brought to a standstill, and then from the neutral position shown the contact arm is moved to engage contact 183. Current from generator now flows through wire 189, contact arm 182, wire 190, ammeter A', wire 190ª, rheostat 187, drill pipe grounds 191, and 192, wires 193, 194, and 195, wheel of distributor 149, wire 196, resistance 179, wires 197 and 198, all of the resistances 175, 176, etc., and back to generator through wire 188.

The circuit just traced constitutes the testing and adjusting circuit in that the maximum resistance which the apparatus is capable of registering on the ammeter A' is connected thereto, and by adjustment of the rheostat 187, the indicating hand of the ammeter can be brought to a zero indication so that the current as subsequently modified in accordance with degree and direction of deviation, will be registered accurately and irrespective of the electrical resistance offered by the drill pipe and the conductor E as they are varied in length.

Following the above-described operation, the pendulum is released by moving contact arm 183 to engage drill pipe ground contact 184, when current flows from generator through ground contacts 184 and 192, wire 193, winding of solenoid 155, and wires 200 and 188 back to generator. Thus the solenoid is connected directly to the generator so that its high resistance winding is energized to move the core 154 and operate the control mechanism to release the pendulum and compass, and to actuate the distributors 149 and 150 to remove the resistance 179 from the circuit and interpose the commutator C' therein through a "pigtail" conductor 201 connected to the pendulum rod 166.

Once the instruments are released the solenoid is deenergized and the ammeter included in the circuit by movement of contact arm 182 into engagement with contact 185. If the borehole is truly vertical, the pendulum contact 169 maintains engagement with the contact 170, so that current now flows from wire 189, contact arm 182, contact 185, wire 183ᵇ, wire 190, ammeter A', wire 190ª, rheostat 187, grounds 191 and 192, wires 193 and 194, wheel 150, conductor 201, rod 166, contacts 168 and 170, wires 202 and 188 back to generator. Thus, the current traversing the ammeter A' is unmodified by the pendulum and so indicated by the hand of the ammeter pointing to division V, and thus indicating that the hole is vertical.

If this borehole is not vertical the commutator C' moves in relation to the pendulum so that the pendulum contact 168 now engages that contact 171 which is vertically thereabove and of that segmental group facing the direction of deviation of the borehole. The compass having been released, it moves to and maintains a north position irrespective of the circumferential position of the commutator C', thereby locating the four segments of the master commutator 130 with the cardinal points of the compass. In doing this, the segments of the commutator are electrically connected to the segments of the commutator C' so that the latter are now directionally located with respect to the cardinal points of the compass.

Through the electrical connections between the segments of the commutator, the slip rings 134, and the resistance units 175, 176, 177, and 178, these resistance units can be selectively interposed in the circuit with any one of the commutator resistances 172 in any combination, depending upon the directional position of that segment of the commutator C' which is engaged by the pendulum contact. For example, if the borehole is deviating in a westerly direction, the pendulum contact 168 will engage any one of the contacts 171, depending upon the maximum degree of deviation, of that segmental group positioned in a westerly direction. Thus a corresponding portion of the respective resistance 172 is removed from the circuit to modify the current traversing the ammeter accordingly and thereby indicate on the ammeter the degree of deviation.

The westerly direction of deviation is indicated on the ammeter by including in the circuit all resistances 175, 176, etc. through the following circuit: From wire 189, arm 182, contact 183, wire 190, ammeter A', wire 190ª, rheostat 187, grounds 191 and 192, wires 193 and 194, wheel 150, conductor 201, pendulum contact 168, segmental contact 171, resistance 172, wire 203, segment 130W of commutator 130, wire 204, subsidiary commutator 134, wire 198, resistances 175 to 178, and wire 188 to generator.

With all resistances 175 to 178 included in the circuit, the amplitude of movement of the ammeter hand is confined to division W thereof, thus indicating that the borehole is deviating in a westerly direction. Manifestly, the degree of deviation is indicated by the position of the ammeter hand within the division W as controlled by that portion of the resistance 172 remaining in the circuit as determined by the pendulum.

From the foregoing example, it will be clear that if, on the other hand, the borehole deviates in a southerly direction, an easterly direction, or a northerly direction, the resistances 175, 176, and 177 respectively, will be removed from the circuit thereby modifying the current accordingly to limit the amplitude of movement of the ammeter hand to the respective dial division and thus indicating the cardinal direction of deviation. This is supplemented by the precise positioning of the hand in any one division to indicate the degree of deviation in accordance with the current as further modified by the respective resistance 172.

Following any directional and degree of deviation reading the parts of the apparatus may be restored to a normal position by moving the arm 182 momentarily into engagement with contact 186 and then back to neutral position when the solenoid 155 is again energized to restore the two surveying instruments to locked positions and rotate the distributor wheels 149 and 150 to the positions shown in Fig. 23. Thus the apparatus is ready for a second survey of the borehole when desired, and the drilling operation may be continued without damage to the apparatus.

I claim:

1. A drill pipe having longitudinally and diametrically opposed portions thickened transversely, one of said portions being formed with a pocket adapted for the reception of a hole surveying instrument.

2. In a borehole survey apparatus; an electric instrument sensitive to deviation; a second electric instrument sensitive to direction of deviation; and electric control means for the two instruments by which they can be locked or released.

3. In a borehole survey apparatus; gravity-operated electrical resistances each variable as to deviation from the vertical and one resistance for each compass point; an electrical resistance variable as to direction of deviation from the vertical; and compass-operated means for connecting the last mentioned resistance to any one of the gravity-operated resistances so that the two resistances are combined and the sum varied in accordance with degree and direction of deviation.

4. In a borehole survey apparatus; gravity-operated electrical resistances each variable as to deviation from the vertical and one resistance for each compass point; an electrical resistance variable as to direction of deviation from the vertical; compass-operated means for selecting a variable resistance as to direction for connection with one of the deviation resistances; and an ammeter correlated to said resistances so as to visibly indicate the degree and direction of deviation.

5. In a borehole survey apparatus; a master commutator having four conducting segments corresponding to the cardinal points; a shaft to which the commutator is fixed; four slip rings fixed to the shaft and electrically connected respectively to the four segments; electrical resistances, one for each of the slip rings and electrically connected thereto; and a compass fixed to the shaft.

6. In an apparatus for surveying boreholes; the combination of a drill stem; a stationary commutator within the drill stem; a pendulum within the drill stem having a contact engaging the commutator, and a support in the drill stem by which the pendulum is gravity-actuated to move the contact over the commutator; and means in the drill stem for elevating the pendulum off of its support and locking it against movement in relation to the commutator.

7. In combination; a sectional and tubular drill pipe, one section of said pipe having a pocket therein and between the walls thereof so as to be offset with relation to the major axis of the bore of said section; a hole surveying instrument in said pocket for modifying electric current in accordance with inclination of said pipe section; current modification indicating means situated adjacent the top of said drill pipe; and a circuit in which said instrument and said means are located, said circuit including conductors secured to one wall of the drill pipe sections and detachably connected to each other at the joints between said sections.

8. An apparatus for surveying wells, comprising in combination with a sectional drill pipe; an electric survey device in the drill pipe between the inner and outer walls thereof, said device being sensitive to inclination and direction of inclination; inclination and direction of inclination indicating means at the surface of the well; and a circuit in which said device and means are located, said circuit including conductors secured to one wall of the drill pipe sections and detachably connected to each other at the joints between said sections.

9. An apparatus for surveying wells, comprising in combination with a sectional drill pipe; an electric survey device in the drill pipe between the inner and outer walls thereof, said device being sensitive to inclination; inclination indicating means at the surface of the well; and a circuit in which said device and means are located, said circuit including conductors secured to one wall of the drill pipe and detachably connected to each other at the joints between the sections.

10. An apparatus for surveying wells, comprising in combination with a sectional drill pipe; an electric survey device in the drill pipe between the inner and the outer walls thereof, said device being sensitive to direction of inclination; direction of inclination indicating means at the surface of the well; and a circuit in which said device and said means are located, said circuit including conductors secured to one wall of the drill pipe sections and detachably connected to each other at the joints between said sections.

ARTHUR R. BARNETT.